(12) United States Patent
Lim et al.

(10) Patent No.: US 7,746,417 B2
(45) Date of Patent: *Jun. 29, 2010

(54) THIN FILM TRANSISTOR ARRAY PANEL FOR A DISPLAY

(75) Inventors: Do-Gi Lim, Cheonan-si (KR); Cheol-Soo Jung, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 273 days.

This patent is subject to a terminal disclaimer.

(21) Appl. No.: 11/870,951

(22) Filed: Oct. 11, 2007

(65) Prior Publication Data
US 2008/0029784 A1 Feb. 7, 2008

Related U.S. Application Data

(63) Continuation of application No. 11/016,404, filed on Dec. 16, 2004, now Pat. No. 7,297,979.

(30) Foreign Application Priority Data

Dec. 18, 2003 (KR) .............. 10-2003-0093263
Apr. 20, 2004 (KR) .............. 10-2004-0027083

(51) Int. Cl.
*G02F 1/1333* (2006.01)
(52) U.S. Cl. .............. 349/40; 349/54; 349/50; 345/93
(58) Field of Classification Search .......... 349/40, 349/54, 149, 42, 43, 50, 192; 257/59, 72, 257/66, 203, E27; 345/93, 206, 904
See application file for complete search history.

(56) References Cited

U.S. PATENT DOCUMENTS

| | | | |
|---|---|---|---|
| 5,852,480 A | | 12/1998 | Yajima et al. |
| 5,936,687 A | * | 8/1999 | Lee .............. 349/40 |
| 6,088,073 A | * | 7/2000 | Hioki et al. ........ 349/40 |
| 6,184,948 B1 | | 2/2001 | Lee |
| 6,333,769 B1 | | 12/2001 | Suzuki et al. |
| 6,697,037 B1 | * | 2/2004 | Alt et al. ........... 345/93 |
| 6,765,630 B2 | | 7/2004 | Nakajima et al. |
| 2001/0028418 A1 | | 10/2001 | Ozaki et al. |
| 2003/0030054 A1 | | 2/2003 | Hector et al. |
| 2003/0156231 A1 | | 8/2003 | Tsukao et al. |

(Continued)

FOREIGN PATENT DOCUMENTS

JP 03-134628 6/1991

(Continued)

*Primary Examiner*—Thoi V Duong
(74) *Attorney, Agent, or Firm*—Innovation Counsel LLP

(57) ABSTRACT

A thin film transistor array panel comprising: an insulating substrate; gate lines formed on the insulating substrate; data lines defining a display region by intersecting the gate lines while being insulated; an electrostatic dispersion line intersecting the gate lines; diodes adhered to the gate lines and to the electrostatic dispersion line; and a repair line for repairing the data lines formed on the insulating substrate outside the display region and intersecting the electrostatic dispersion line while being insulated. According to the present invention, since static electricity flowing along the repair line is not transferred to the data lines, defects of a thin film transistor of the display region may be prevented.

7 Claims, 5 Drawing Sheets

U.S. PATENT DOCUMENTS

| | | |
|---|---|---|
| 2004/0001176 A1 | 1/2004 | Kim et al. |
| 2004/0173797 A1 | 9/2004 | Kim |
| 2005/0078235 A1 | 4/2005 | Ozaki et al. |

FOREIGN PATENT DOCUMENTS

| | | |
|---|---|---|
| JP | 07-318980 | 12/1995 |
| JP | 08-146460 | 6/1996 |
| JP | 09-311642 | 12/1997 |
| JP | 10-039790 | 2/1998 |
| JP | 10-268794 | 10/1998 |
| JP | 11-271722 | 10/1999 |
| JP | 11-326948 | 11/1999 |
| JP | 2000-019556 | 1/2000 |
| JP | 2001-147649 | 5/2001 |
| JP | 2002-182246 | 6/2002 |
| JP | 2002-328384 | 11/2002 |
| JP | 2004-538512 | 12/2004 |

* cited by examiner

THIN FILM TRANSISTOR ARRAY PANEL FOR A DISPLAY

CROSS-REFERENCE TO RELATED APPLICATIONS

This application is a Continuation of U.S. patent application Ser. No. 11/016,404 filed on Dec. 16, 2004, now U.S. Pat. No. 7,297,979 and now allowed, which claims the benefit of priority to Korean Patent Application Nos. 10-2003-0093263, filed on Dec. 18, 2003 and 10-2004-0027083, filed Apr. 20, 2004 the disclosures of which are incorporated herein by reference in their entireties.

BACKGROUND OF THE INVENTION (a) Field of the Invention

The present disclosure relates to a thin film transistor array panel for a display.

(b) Description of the Related Art

A display provides information as an image. Liquid crystal displays (LCDs) and organic EL displays (OLEDs) are used more than other flat displays, and thin film transistor (TFT) array panels have a role as display controllers in LCDs and OLEDs.

A TFT array panel has a plurality of gate lines in rows, a plurality of data lines in columns, a plurality of pixel electrodes formed at pixel areas defined by intersection of the gate lines and the data lines, and TFTs connecting the pixel electrodes to the gate lines and data lines. The TFTs switch transmission of data signals that are transferred through the data lines to the pixel electrodes according to gate signals transferred through the gate lines. A driving voltage generator generates a gate-on voltage or a gate-off voltage and transfers it to a plurality of gate driving integrated circuits (ICs). The gate driving ICs generate gate signals according to the control of a signal controller. Data signals are generated by a plurality of data driving ICs that transform a gray signal from the signal controller to an analog voltage.

A signal controller and a driving voltage generator are formed on a printed circuit board (PCB) outside the LCD array panel, and a driving IC is embodied on a flexible printed circuit (FPC) interposed between a PCB and an LCD assembly. Generally, two PCBs are used. One of them, called a gate PCB, is located on one side of the liquid crystal (LC) panel assembly, and the other, called a data PCB, is located on another side. Since a gate driving IC is interposed between the gate PCB and a display panel, and a data driving IC is interposed between the data PCB and the display panel, each IC respectively receives signals from a corresponding PCB.

However, the gate PCB may not be used and only the data PCB may be used without position change of the gate FPC and the gate driving IC on the gate FPC. In this case, both the data FPC and the TFT array panel have wirings to transfer signals from the signal controller and a driving voltage generator on the data PCB to the gate driving ICs, Further, the gate FPC also has wirings to transfer the signals the next gate driving IC.

Meanwhile, many fine wires are formed on the TFT array panel, some of which may become disconnected or shorted. In preparation for occurrence of such things, a structure for repairing the disconnected or shorted circuit is prepared to prevent the panel from discard. A repair line for repairing disconnection of a data line is one of the most popular methods. The repair line surrounds the display region of the TFT panel and intersects the both ends of data lines with an insulating layer interposed therebetween. When a data line is disconnected, both ends of the disconnected data line are connected to the repair line by irradiating a laser.

However, when a static electricity flows into the repair line, the static electricity may destroy the insulating layer and flow into the data lines intersecting the repair line. As a result, a defect of a TFT in the display region may be caused.

SUMMARY OF THE INVENTION

The technical subject on the present invention prevents damage of a thin film transistor array panel from static electricity through a repair line.

The present invention provides a thin film array panel, comprising: an insulating substrate; gate lines formed on the insulating substrate; data lines intersecting the gate lines while being insulated, and defining a display region defined by intersecting the gate lines; electrostatic dispersion lines intersecting the gate lines; diodes attached to the gate lines and to the electrostatic dispersion lines; repair lines for repairing the data lines, formed on the insulating substrate outside the display region, and intersecting the electrostatic dispersion line.

Here, the diodes may include a first diode which has two electrodes connected to the gate lines and to the electrostatic dispersion lines so a forward current can flow from the gate lines to the electrostatic dispersion lines, and a second diode which has two electrodes connected to the gate lines and to the electrostatic dispersion lines so a forward electrostatic current can flow from the electrostatic dispersion lines to the gate lines.

The repair lines may include a first repair line intersecting the data lines, a second repair line not intersecting the data lines, the second repair line may intersect the electrostatic dispersion line while being insulated.

The thin film transistor array panel may further comprise a wiring that is farther than the second repair line from the display region and is adjacent to the second repair line. The electrostatic dispersion line may intersect the repair line before the repair line intersects the data lines.

The thin film transistor array panel may further comprise an insulating layer interposed between the repair line and the electrostatic dispersion line.

The repair line may also intersect the data lines.

A thin film transistor array panel is also provided, comprising: an insulating substrate; gate lines formed on the insulating substrate; data lines insulated from the gate lines, intersecting the gate lines, and defining a display region by intersecting the gate lines; electrostatic dispersion lines intersecting the gate lines; diodes connected to the gate lines and the electrostatic dispersion lines; repair lines for the data lines, formed on the insulating substrate outside the display region and intersecting the electrostatic dispersion lines; periphery wiring paths formed on the insulating substrate outside the display region and intersecting the electrostatic dispersion lines while being insulated, and the main body?.

Also it is desirable that the periphery wiring paths intersect the second signal line while being insulated.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE PREFERRED EMBODIMENTS

Figure 1:
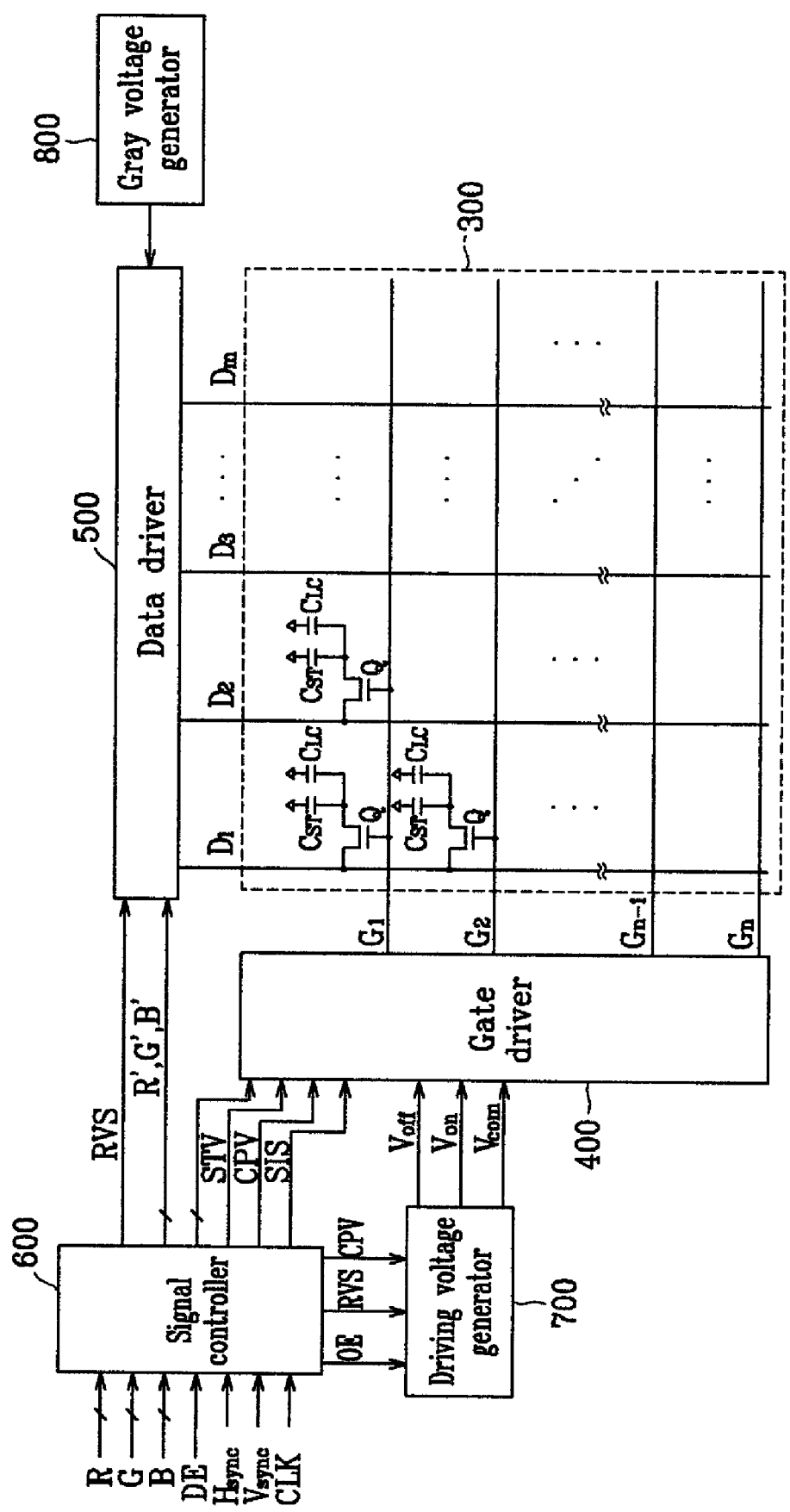
FIG. 1 is a perspective view of a liquid crystal display according to an embodiment of the present invention.

Preferred embodiments of the present invention now will be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. By contrast, it will be understood that when an element such as a layer, film, region, or substrate is referred to as being "directly on" another element, it means that intervening elements must not be present.

Figure 2:
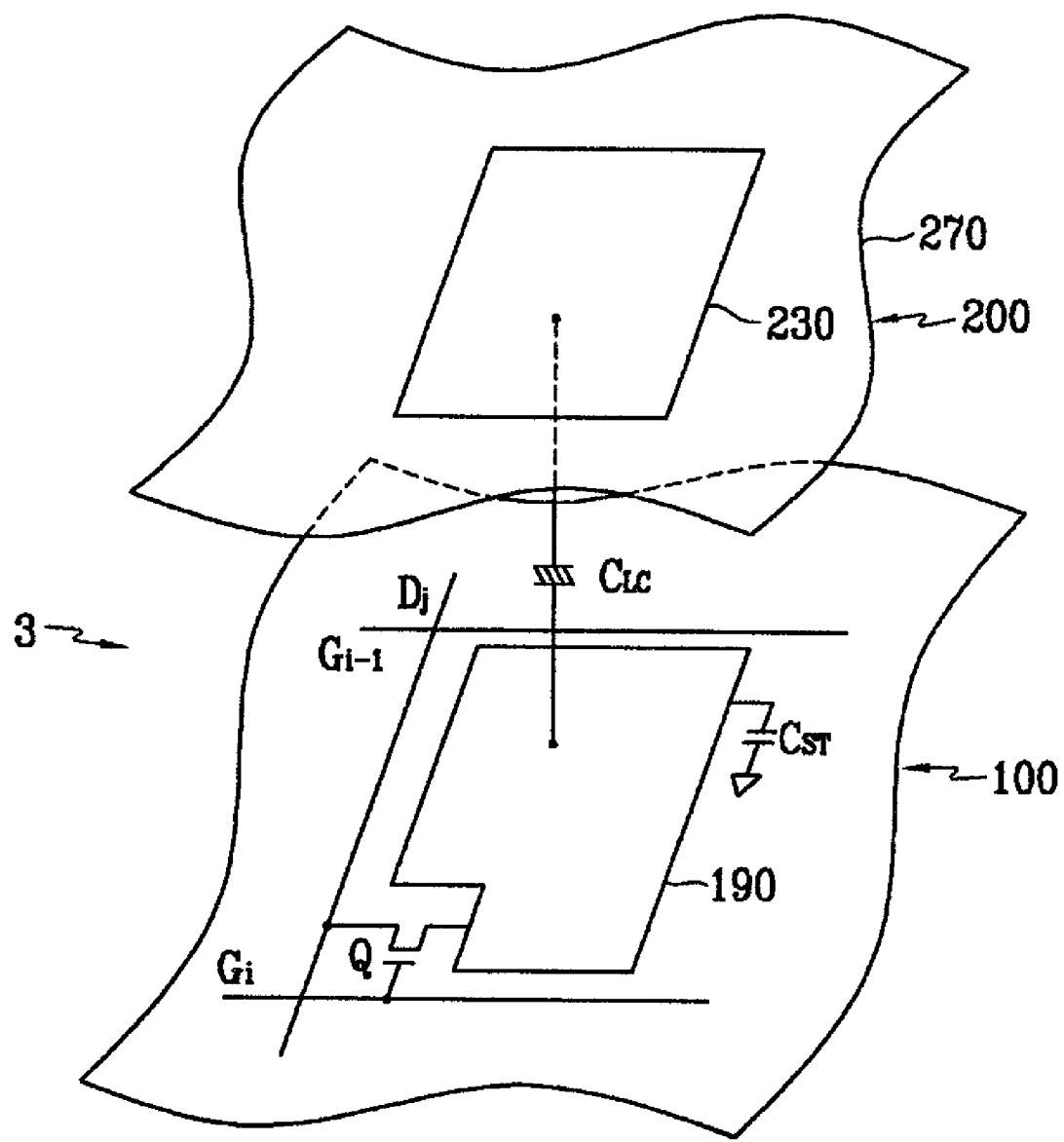
FIG. 2 is an equivalent circuit of a pixel of a liquid crystal display according to an embodiment of the present invention.

FIG. 1 is a perspective view of a liquid crystal display according to an embodiment of the present invention, and FIG. 2 is an equivalent circuit of a pixel of a liquid crystal display (LCD) according to an embodiment of the present invention.

As shown in FIG. 1, an LCD has a liquid crystal (LC) panel assembly 300, a gate driver 400 connected to the LC panel assembly 300, a data driver 500 connected to the LC panel assembly 300, a driving voltage generator 700 connected to the gate driver 400, a gray voltage generator 800 connected to the data driver 500, and a signal controller 600 controlling the driving voltage generator 700 and the gray voltage generator 800.

FIG. 1 shows that the LC panel assembly 300 includes a plurality of signal lines $G_1$-$G_n$ and $D_1$-$D_m$, and a plurality of pixels connected to the signal lines. Each pixel includes a switching element Q connected to the signal lines $G_1$-$G_n$ and $D_1$-$D_m$, and to an LC capacitor $C_{lc}$ and a storage capacitor $C_{st}$. Signal lines $G_1$-$G_n$ and $D_1$-$D_m$ include a plurality of scanning signal lines or gate lines $G_1$-$G_n$ transferring a scanning signal or a gate signal in columns, and data signal lines or data lines $D_1$-$D_m$ transferring an image signal or a data signal in rows. The switching element Q has three terminals. The control electrode is connected to the gate lines $G_1$-$G_n$, the input electrode is connected to the data lines $D_1$-$D_m$, and the output electrode is connected to an electrode of the LC capacitor $C_{lc}$ and to an electrode of the storage capacitor $C_{st}$.

The other electrode of the LC capacitor $C_{lc}$ is connected to a common voltage $V_{com}$ or a reference voltage. The other electrode of the storage capacitor $C_{st}$ is connected to another voltage, for example, a reference voltage. However, the other electrode of the storage capacitor $C_{st}$ may be connected to the adjacent upper gate line (called a "previous gate line" in the following). The former type of storage capacitor $C_{st}$ is called a separate wire type, and the latter type of storage capacitor $C_{st}$ is called a previous gate type.

Meanwhile, the structure of the LC panel assembly 300 is roughly shown in FIG. 2. For convenience, one pixel is shown in FIG. 2.

As shown in FIG. 2, the LC panel assembly 300 has a lower panel 100, an upper panel 200 facing the lower panel 100, and an LC layer 3 interposed between the two panels 100 and 200. The lower panel 100 has gate lines $G_{i-1}$, $G_i$, a data line $D_j$, a switching element Q, and a storage capacitor $C_{st}$. An LC capacitor $C_{lc}$ has two electrodes, one being a pixel electrode of the lower panel 100 and the other being a common electrode 270 of the upper panel 200, and the LC layer 3 interposed between the two electrodes 190 and 270 functions as a dielectric.

The pixel electrode 190 is connected to the switching element Q, and the common electrode 270 is entirely formed on the upper panel 200 and is connected to the common voltage $V_{com}$.

Herein, the arrangement of LC molecules is changed according to an electric field generated by the pixel electrode 190 and the common electrode 270, and correspondingly the polarization of the incident light is changed in the LC layer 3. Such a change of the polarization results in difference of transmission ratio of the incident light due to polarizing films (not shown in FIG. 2) attached to the panels 100 and 200.

Moreover, an independent wiring applied with a common voltage is formed on the lower panel 100. The storage capacitor $C_{st}$ is formed between the pixel electrode 190 and the independent wiring. In the previous gate type, as the pixel electrode 190 overlaps the previous gate line $G_{i-1}$ with an insulating layer interposed therebetween to form the storage capacitor $C_{st}$ are.

In FIG. 2, a metal-oxide semiconductor (MOS) transistor is illustrated as an example of a switching element Q. The MOS transistor is embodied by a thin film transistor (TFT) which has a channel layer of amorphous silicon or polysilicon. Unlike in FIG. 2, the common electrode 270 may be also formed on the lower panel 100, and in this case both the electrodes 190 and 270 may be formed on the lower panel to have linear shapes.

Color filters 230 of red, green, and blue are formed on the upper panel 200 corresponding to the pixel electrodes 190 to enable color display. As shown in FIG. 2, though the color filters 230 are usually formed on the corresponding region of the upper panel 200, the color filter 230 may be formed on the upper or lower region of the pixel electrode 190 on the lower panel 100.

Again referring to FIG. 1, a driving voltage generator 700 generates voltage such as a gate-on voltage $V_{on}$ for turning on the switching element Q, and a gate-off voltage $V_{off}$ for turning off the switching element Q.

A gray voltage generator 800 generates a plurality of gray voltages related to the brightness of the LCD.

A gate driver 400, called a scan driver, is connected to gate lines of the LC panel assembly 300, and it compensates the gate-on voltage $V_{on}$ of the driving voltage generator 700 and supplies a gate signal to gate lines $G_1$-$G_n$. The gate signal is formed by combination of the gate-on voltage $V_{on}$ and the gate-off voltage $V_{off}$.

A data driver 500, called a source driver, is connected to the data lines $D_1$-$D_m$ of the LC panel assembly 300, and it selects a gray voltage from the gray voltage generator 800 and supplies a gray voltage as a data signal to the data lines $D_1$-$D_m$.

A signal controller 600 generates a control signal controlling the operation of the gate driver 400, the data driver 500, and the driving voltage generator 700, and it supplies the respective corresponding control signals to the gate driver 400, the data driver 500, and the driving voltage generator 700.

Figure 3:
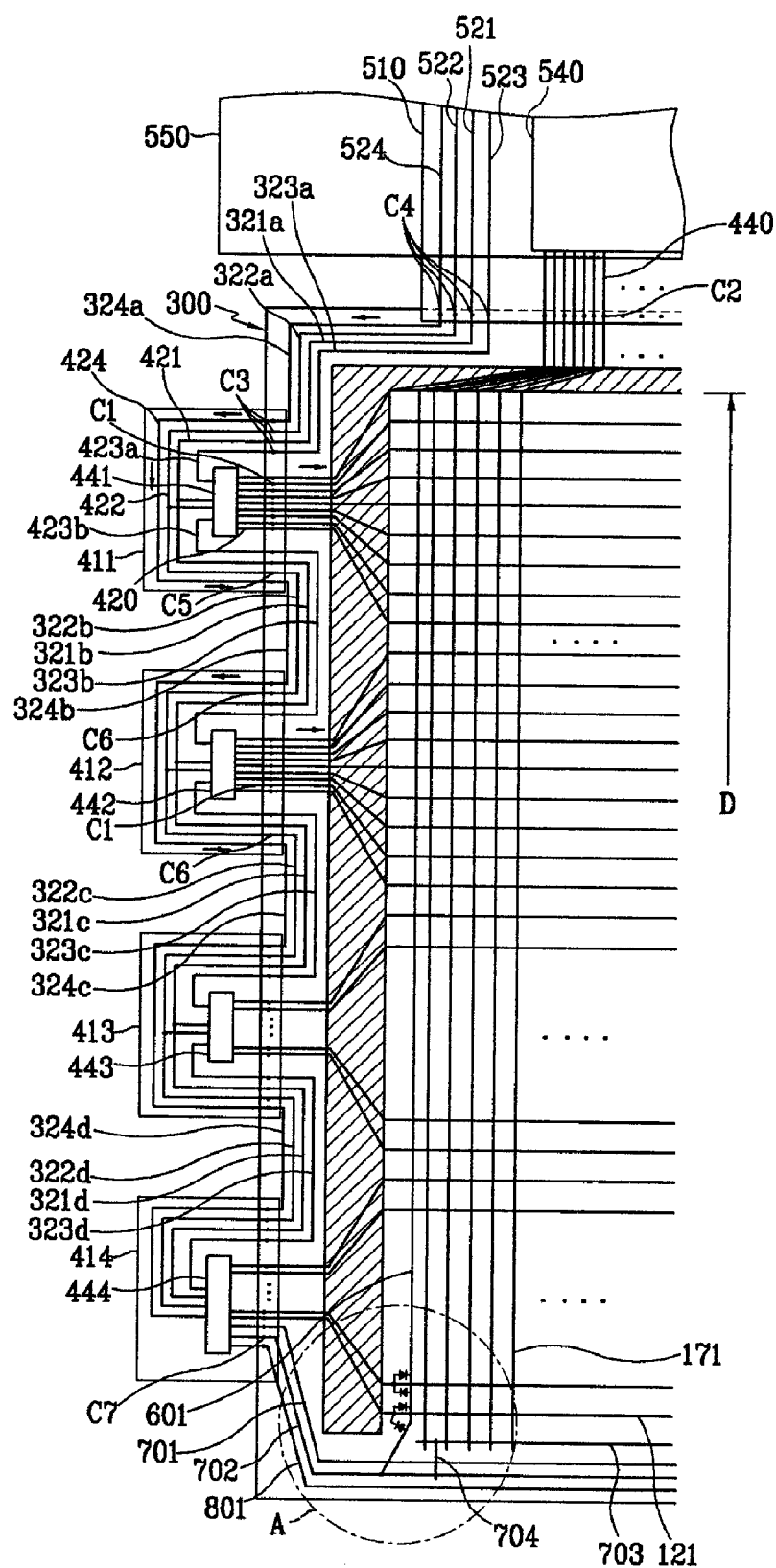
FIG. 3 is a rough layout view of a liquid crystal display according to an embodiment of the present invention.

As shown in FIG. 3, generally the gate driver 400 has a plurality of gate driving integrated circuits (ICs) 441-444 and the data driver 500 has a plurality of data driving ICs 540. Each IC may be formed on the inside or outside of the LC panel assembly 300 in the same manufacturing process of signal lines $G_1$-$G_n$ and $D_1$-$D_m$ and the thin film transistor Q.

Henceforth, a structure of a liquid crystal display (LCD) according to an embodiment of the present invention will be described in detail.

FIG. 3 is a rough layout view of a liquid crystal display according to an embodiment of the present invention.

As shown in FIG. 3, a printed circuit board (PCB) 550 is disposed above the LC panel assembly 300 including gate lines $G_1$-$G_n$ and data lines $D_1$-$D_m$. The PCB 550 has circuit elements such as a signal controller 600, a driving voltage generator 700, and a gray voltage generator 800 for operating the LCD. The LC panel assembly 300 is electrically and physically connected to the PCB 550 through a flexible printed circuit (FPC) 510.

A data FPC 510 has the data driving IC 540, a plurality of data lead lines 440, and a plurality of gate driving signal wiring paths 521-524. Since the data lead lines 440 are connected to the output terminal of the data driving IC 540 and to data lines $D_1$-$D_m$ through a conductor C2, they transfer pixel signals from the data driving IC 540 to the data lines $D_1$-$D_m$. For convenience, only four gate driving signal wiring paths 521-524 are shown in FIG. 3, but practically the gate driving signal wiring paths number more than five. In the embodiment of the present invention, the signal line 521 transfers a gate-on voltage, for example, the signal line 522 transfers a gate-off voltage or a gate clock signal, and the signal line 523 transfers a vertical synchronous starting signal. And the signal line 524 transfers a sequence information signal (SIS) from the signal controller 600.

Signal lines 521-524 are electrically connected to circuit elements of the PCB 550, as is the data driving IC 540.

Four gate driving FPCs 411-414 are adhered to the left side of the LC panel assembly 300, and gate driving ICs 441-444 are respectively disposed on the gate driving FPCs 411-414. A plurality of gate lead lines 420 and gate driving signal wiring paths 421, 422, 423a, 423b, and 424 are formed on the gate FPCs 411-414. Though signal lines 421, 422, and 424 of the gate driving signal wiring paths 421, 422, 423a, 423b, and 424 are connected to input terminals of the gate driving ICs 441-444 through branch signal lines, one end of signal lines 423a and 423b is connected to gate driving ICs 441-444. The upper signal line 423a is connected to the input terminal of gate driving ICs 441-444, and the lower signal line 423b is connected to the output terminal of gate driving ICs 441-444. For convenience only five gate driving signal wiring paths 421, 422, 423a, 423b, and 424 are shown in FIG. 3, but the number of gate lines may be changed.

As shown in FIG. 1, pixel regions are defined by intersecting gate lines $G_1$-$G_n$ in rows and data lines $D_1$-$D_m$ in columns. A display region D includes a plurality of pixel regions to express images. Since a black matrix is formed outside of the display region D (expressed as oblique lines in FIG. 3), light leakage out of the display region D may be prevented. Though gate lines $G_1$-$G_n$ and data lines $D_1$-$D_m$ are substantially parallel in the display region D, their distance are getting closer as they gather in group by group in the outside of the display area. Afterward they are substantially parallel again with a closer distance than in the display region D.

Gate driving signal wiring paths 321a-321d, 322a-322d, 323a-323d, and 324a-324d are formed on the left upper and left edge 11 of the outside of the display region D of the LC panel assembly 300. Gate driving signal wiring paths 321a, 322a, 323a, and 324a formed on the left upper edge are electrically connected to gate driving signal wiring paths 521, 522, 523, 524 of the data FPC 510 through a contact C4, and to gate driving signal wiring paths 421, 422, 423a, and 424 of the uppermost gate FPC 411 with a contact C3. Other gate driving signal wiring paths 321b-321d, 322b-322d, 323b-323d, and 324a-324d are disposed between the gathering section of the gate lines $G_1$-$G_n$. They connect gate driving signal wiring paths 421, 422, 423a, 423b, and 424 of a gate FPCs 411-414 to gate driving signal wiring paths 421, 422, 423a, 423b, and 424 of an adjacent gate FPCs 411-414 through contacts C5 and C6.

Meanwhile, in addition to the data FPC 510, an FPC not including the data driving IC 540 (not shown in FIG. 3) may be adhered to the PCB 550 and to the LC panel assembly 300. In this case, gate driving signal wiring paths 521-524 may be disposed on the FPC.

Here, gate lines $G_1$-$G_n$, data lines $D_1$-$D_m$, and signal lines 521-524 of the LC panel assembly 300 are interconnected to lead lines 420 and 440 and signal lines 321a-321d, 322a-322d, 323a-323d, and 324a-324d of FPCs 411-414 and 510 with anisotropic conducting layers through contacts C1-C6.

First to third repair lines 701, 702, and 703 are formed on the bottom outside of the display region D. The third repair line 703 intersects the ends of the data lines while being insulated. Also, a repair line connection bar 704 is formed on the same region, and it intersects the first to the third repair lines 701, 702, and 703 while being insulated. The first and the second repair lines 701 and 702 are connected to repair lines (not shown in FIG. 3) formed on the top side outside of the display region D along connecting wiring paths of FPCs 411-414. A repair line (not shown in FIG. 3) formed on the top side outside of the display region D intersects the data lines while being insulated.

Also, an electrostatic dispersion line 601 intersectintersects the starting part of the gate lines, and is formed in the left side of the first data line in parallel therewith. In this case, the electrostatic leakage line 601 is connected to gate lines with two diodes. The electrostatic dispersion line 601 intersectintersects the first and the second repair lines 701 and 702 while being insulated.

A wiring pattern 801 may be formed outside of the first repair line 701, and a common voltage may be supplied to the wiring pattern 801.

Figure 4:
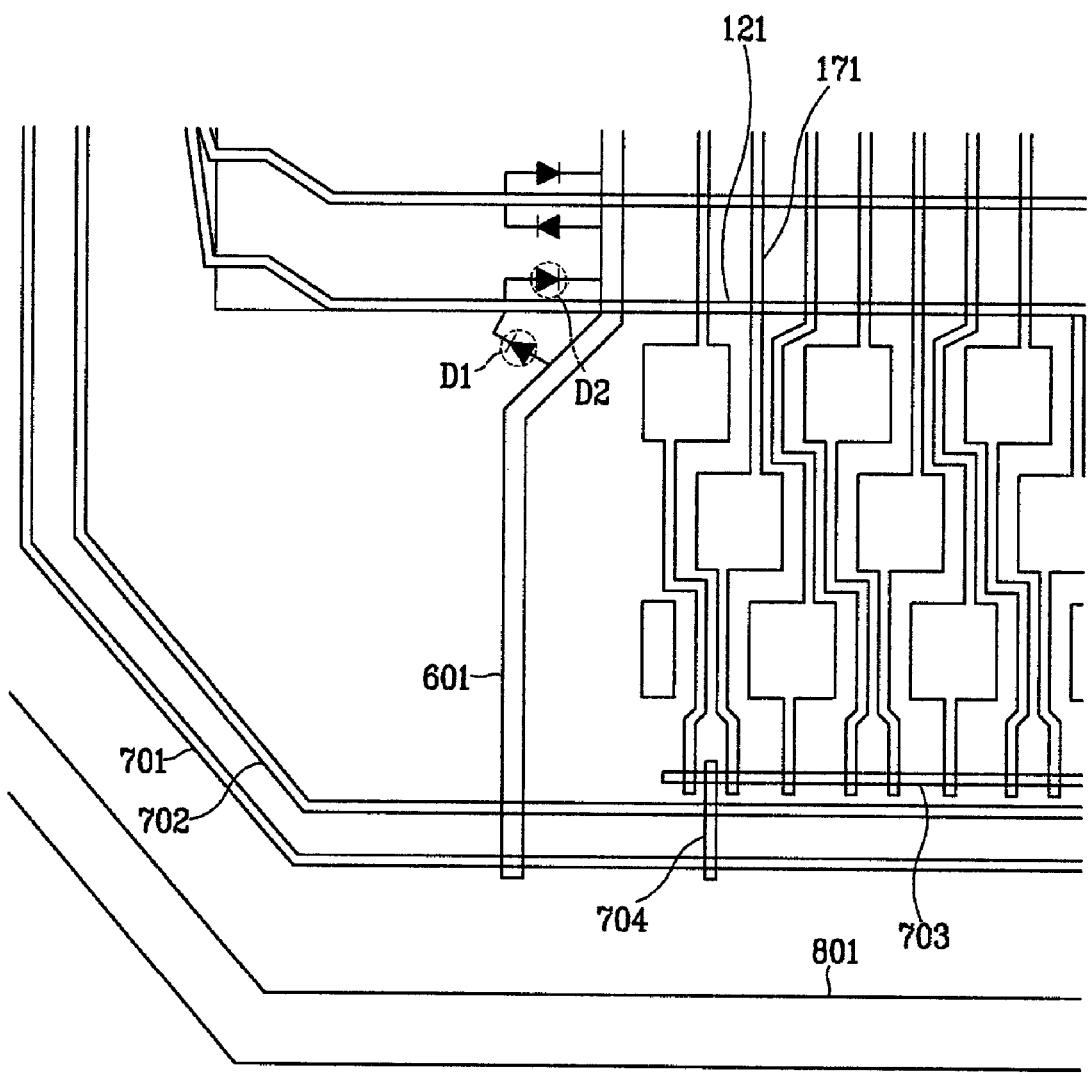
FIG. 4 is an enlarged layout view of part A of the liquid crystal display of FIG. 3.

FIG. 4 is an enlarged layout view of part A of the LC display of FIG. 3.

A display region D is defined by intersecting the gate lines 121 and the data lines 171. Here, as the width of the data line 171 is enlarged at a portion of outside of the display region D to form an inspection pad. The inspection pad is contacted with an inspection probe to check whether the data line 171 has defects or not.

In the left of the display region D, the electrostatic dispersion line 601 intersectintersectintersects the gate line 121, and the electrostatic dispersion line 601 is connected to the gate line 121 with two corresponding diodes D1 and D2. One of the two diodes is configured such that a forward current flows from the gate line 121 to the electrostatic dispersion line 601, and the other is configured such that a forward current flows from the electrostatic dispersion line 601 to the gate line 121.

When static electricity is introduced into one of gate lines 121, the static electricity is transmitted to the electrostatic dispersion line 601 through diode D2 and is dispersively scattered over all the gate lines 121 through the diode D1. During this electrostatic dispersion process, the static electricity may be exhausted by burning out the diodes D1 and D2.

Diodes D1 and D2 has a structure of a TFT of which the gate electrode and the source electrode are connected to the same wiring. Namely, the first diode has a structure of a TFT of which the gate electrode and the source electrode are connected to the electrostatic dispersion line 601 and the drain electrode is connected to the gate line 121. The second diode D2 has a structure of a TFT of which the gate electrode and the source electrode are connected to the gate line 121, and the drain electrode is connected to the electrostatic dispersion line 601.

Since such diodes D1 and D2 form a channel to flow a current only when a high voltage over a predetermined value is applied, the diodes D1 and D2 form the channel by a static electricity having high voltage but do not form the channel by a scanning signal voltage driving the LCD. Therefore, a scanning signal of the gate line 121 is not transmitted to another gate line 121.

The first to the third repair lines 701, 702, and 703 are formed on the insulating substrate outside the display region, and the third repair line 703 among them intersectintersects the data lines 171. The first and the second repair lines 701 and 702 are connected to the repair lines (not shown in FIG. 3) formed on the top side outside of the display region D by connecting wiring paths of the FPC. The first, the second, and the third repair lines 701, 702, and 703 intersectintersectintersect the repair line connection bar 704.

When one of the data lines 171 is disconnected, the bottom portion of the disconnected data line 171 and the third repair line 703, the third repair line 703 and the repair line connection bar 704, the repair line connection bar 704 and one of the first and the second repair lines 701 and 702 is connected, and the top portion of the disconnected data line 171 is connected to the bottom portion of the disconnected data line 171 through one of the first and the second repair lines 701 and 702. Next, portions of repair lines 701, 702, and 703 not applied to the circuitous transferring of the data signal are disconnected from the other portion which are applied. Here, connecting and disconnecting of wires are carried out by irradiating a laser.

For reducing the capacitive load due to repair lines 701 and 702, the first and the second repair lines 701 and 702 are formed not to intersectintersect the data line 171, and the first and the second repair lines 701 and 702 are connected the third repair line 703 intersectintersectintersecting the data line 171 through the repair line connection bar 704. In case of necessity, the repair line connection bar 704 may be omitted and repair lines 701 and 702 may directly intersectintersect the data line 171.

The electrostatic leakage line 601 intersectintersectintersects the repair lines 701 and 702 while being insulated.

Figure 5:
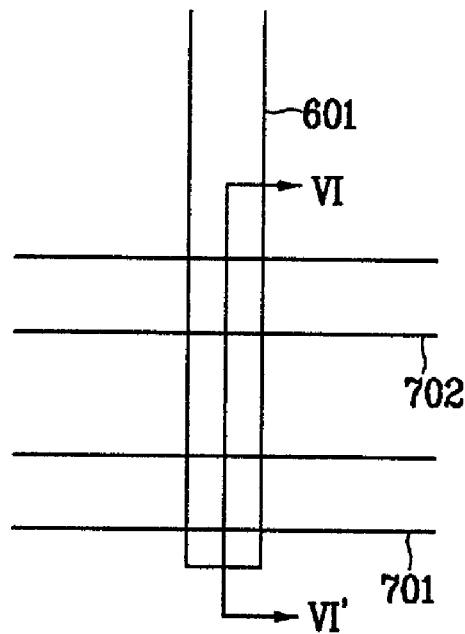
FIG. 5 is a layout view of a intersecting condition of a repair line and an electrostatic dispersion line in a thin film transistor display according to an embodiment of the present invention.
Figure 6:
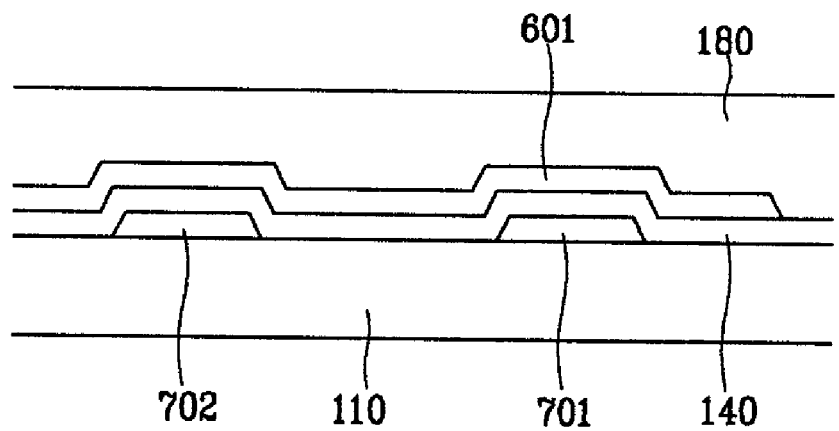
FIG. 6 is a sectional view of the thin film diode array panel shown in FIG. 5 taken along the line VI-VI'.

Henceforth referred to FIG. 5 and FIG. 6, the intersectintersecting structure of an electrostatic dispersion line 601 and a repair lines 701 and 702 will be described.

Since the repair lines 701 and 702 and the gate lines 121 are formed on the same layer and the electrostatic dispersion line 601 and the data lines 171 are formed on the same layer, a gate insulating layer 140 is interposed between the electrostatic dispersion line 601 and the repair lines 701 and 702. Accordingly, the electrostatic dispersion line 601 and the repair line 701 are insulated by the gate insulating layer 140. In addition a passivation layer 180 is formed on the electrostatic dispersion line 601.

Outside of the repair line 701, a wiring path 801 is formed, and the wiring path 801 may be intended to supply a common voltage to a contact ball (not shown in FIG. 4) contacting a common electrode 270 on the upper panel (270 as shown in FIG. 2). The distance between the repair line 701 and the wiring path 801 is very short on an out lead bonding (OLB) pad.

In such a structure of the TFT array panel, static electricity often flows into the wiring path 801 formed on the outermost side of the TFT display panel. The static electricity transfers to the adjacent repair line 701 on an OLB pad (414 as shown in FIG. 3) in which the repair line 701 and the wiring path 801 are close, and flows into the adjacent repair line 701. The static electricity flowing into the repair line 701 is transferred to the electrostatic dispersion line 601 that intersects the repair line near? before the repair line connection bar 704 intersects the repair line 701, and the static electricity flowing into the electrostatic dispersion line 601 is dispersed over the entire array panel. Even though the repair line 701 and the electrostatic dispersion line 601 are insulated by the gate insulating layer 140, the static electricity has a high voltage that can cause insulating breakdown of the gate insulating layer 140, and it is transferred to an electrostatic dispersion line 601.

Consequently, the static electricity flowing into the repair line 701 cannot penetrate into the display region due to intersection of the repair line 701 and the electricity dispersion line 601, and the defect of the TFTs in the display region D incurred by the static electricity may be prevented.

According to the present invention, since static electricity flowing into the repair line is not transferred to the data line, the defect of a thin film transistor in the display region incurred by the static electricity can be prevented.

Although the detail embodiments have been described herein with reference to the accompanying drawings, it is to be understood that the present invention is not limited to those precise embodiments, and various changes and modifications applied by the concept of the present invention are intended to be included within the scope of the invention as defined by the appended claims.

What is claimed is:

1. A display panel comprising:
    an insulating substrate;
    a display region on the insulating substrate;
    an electrostatic dispersion line near the display region;
    a diode connected to a gate line and the electrostatic dispersion line; and
    a repair line for repairing a defect in the display region formed on the insulating substrate outside the display region and insulatedly intersecting the electrostatic dispersion line outside the display region.

2. The display panel of claim 1, further comprising an insulating layer interposed between the repair line and the electrostatic dispersion line.

3. The display panel of claim 1,
    wherein the diode is disposed on the insulating substrate outside the display region.

4. The display panel of claim 3, further comprising;
    a repair line connection bar intersecting both of the first repair line and the second repair line.

5. The display panel of claim 3, further comprising an insulating layer interposed between the repair lines and the electrostatic dispersion line.

6. The display panel of claim 3, further comprising:
a diode connected to the electrostatic dispersion line, wherein the diode are disposed on the insulating substrate outside the display region.

7. A display panel comprising:
an insulating substrate;
a display region on the insulating substrate;
an electrostatic dispersion line near the display region;
a first repair line intersecting a data line extended from the display region formed on the insulating substrate outside the display region; and
a second repair line not intersecting the data line and insulatedly intersecting the electrostatic dispersion line outside the display region.

\* \* \* \* \*